(12) United States Patent
Nemoto et al.

(10) Patent No.: US 7,088,905 B1
(45) Date of Patent: Aug. 8, 2006

(54) LIGHT GUIDE, LINE-ILLUMINATING DEVICE, AND IMAGE-SCANNING DEVICE

(75) Inventors: Hiroyuki Nemoto, Tokyo (JP);
Hirohiko Iwase, Tokyo (JP);
Hidemitsu Takeuchi, Tokyo (JP);
Takashi Kishimoto, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 0 days.

(21) Appl. No.: 11/354,567

(22) Filed: Feb. 15, 2006

Related U.S. Application Data

(63) Continuation-in-part of application No. 11/137,692, filed on May 25, 2005.

(30) Foreign Application Priority Data

May 26, 2004 (JP) ............................. 2004-156305

(51) Int. Cl.
*G02B 6/00* (2006.01)
(52) U.S. Cl. .................. 385/147; 385/901; 362/610
(58) Field of Classification Search ............... 385/147, 385/901; 362/610
See application file for complete search history.

(56) References Cited

U.S. PATENT DOCUMENTS

| | | | | |
|---|---|---|---|---|
| 5,655,827 | A * | 8/1997 | Kaneko et al. ............... | 362/613 |
| 5,838,403 | A * | 11/1998 | Jannson et al. ............... | 349/65 |
| 5,838,404 | A * | 11/1998 | Ozeki et al. .................. | 349/65 |
| 5,999,685 | A * | 12/1999 | Goto et al. ................... | 385/146 |
| 6,259,082 | B1 * | 7/2001 | Fujimoto et al. ............ | 250/208.1 |
| 6,305,811 | B1 * | 10/2001 | Beeson et al. ............... | 362/626 |
| 6,480,307 | B1 * | 11/2002 | Yang ............................ | 359/15 |
| 6,585,356 | B1 * | 7/2003 | Ohkawa ....................... | 347/65 |
| 6,612,730 | B1 * | 9/2003 | Ikeda ........................... | 362/558 |
| 6,744,033 | B1 * | 6/2004 | Ikeda ........................... | 250/216 |
| 6,798,574 | B1 * | 9/2004 | Kim .............................. | 359/566 |
| 6,808,280 | B1 * | 10/2004 | Uemura et al. .............. | 362/604 |
| 6,845,212 | B1 * | 1/2005 | Gardiner et al. ............ | 385/146 |
| 2005/0265684 | A1 * | 12/2005 | Nemoto et al. .............. | 385/146 |

FOREIGN PATENT DOCUMENTS

| | | |
|---|---|---|
| JP | 04-329521 | 11/1992 |
| JP | 08-043633 | 2/1996 |
| JP | 08-163320 | 6/1996 |
| JP | 10-112782 | 4/1998 |
| JP | 10-126581 | 5/1998 |

(Continued)

*Primary Examiner*—John D. Lee
*Assistant Examiner*—Rhonda S. Peace
(74) *Attorney, Agent, or Firm*—Carrier, Blackman & Associates, P.C.; Joseph P. Carrier; William D. Blackman

(57) ABSTRACT

The present invention provides a light guide, a line-illuminating device, and an image-scanning device that provide excellent uniformity in the amount of light produced. A light-reflecting portion comprised of spherical concave surfaces becomes a reflecting surface having spherical convex surfaces when it is seen from the inside of the light guide. Even when the incident angle of light from the light source unit is slightly offset, the reflection angle in spherical convex surfaces significantly changes, and light is reflected uniformly toward the upper surface serving as a light-emitting surface. In particular, when the fine spherical concave portions of the light-reflecting portion have a small depth, the incident light from the end surface is reflected toward the upper surface, serving as a light-emitting surface, and both side surfaces without reflecting back to the light-emitting unit side, so that uniform reflection can be achieved.

19 Claims, 9 Drawing Sheets

FOREIGN PATENT DOCUMENTS

| | | |
|---|---|---|
| JP | 11-136451 | 5/1999 |
| JP | 11-284232 | 10/1999 |
| JP | 11-313195 | 11/1999 |
| JP | 2000-307808 | 11/2000 |
| JP | 2001-201639 | 7/2001 |
| JP | 2001-242322 | 9/2001 |
| JP | 2002-190917 | 7/2002 |
| JP | 2004-056425 | 2/2004 |

* cited by examiner

PRIOR ART

LIGHT GUIDE, LINE-ILLUMINATING DEVICE, AND IMAGE-SCANNING DEVICE

CROSS-REFERENCE TO RELATED APPLICATIONS

The present invention is a Continuation-In-Part of copending application Ser. No. 11/137,692, filed on May 25, 2005, which claims priority under 35 USC 119 based on Japanese patent application No. 2004-156305, filed on May 26, 2004. The subject matter of these priority documents is incorporated by reference herein.

BACKGROUND OF THE INVENTION

1. Field of the Invention

The present invention relates to a light guide, a line-illuminating device, and a contact-type or reduction-type image-scanning device (image sensor) in which the line-illuminating device is incorporated.

2. Description of the Prior Art

An image-scanning device for a facsimile machine, a copying machine, an image scanner or the like is provided with a line-illuminating device for linearly illuminating a document surface along a main scanning field. In the line-illuminating device, light is introduced into an end surface of a bar-shaped or plate-shaped transparent light guide, reflected on the internal surfaces, and emitted from a light-emitting surface.

Japanese Patent Application Publication No. 8-43633 has disclosed a light guide having a cylindrical shape in which incident light from the end surface is reflected on a light-reflecting portion provided on the bottom surface so as to be emitted from the light-emitting surface.

Japanese Patent Application Publication No. 10-112782 has disclosed a light guide having a plate shape in which incident light from the end surface is reflected on a light-reflecting portion provided on the bottom surface so as to be emitted from the light-emitting surface. According to paragraph [0009] of this document, the light-reflecting portion includes a plurality of tubular concave portions whose axis is perpendicular to the longitudinal direction of the light guide.

Japanese Patent Application Publication No. 2001-201639 has disclosed that a light scattering pattern is formed with laser light, and that light-reflecting portions near to the end surface are spaced apart in an island shape. This document has also disclosed that a plurality of light scattering patterns may be superposed in paragraph [0016] and FIG. 4 (b).

Japanese Patent Application Publication No. 2004-56425 has disclosed that flat portions are formed between the bottom surface and both side surfaces of a light guide by C-chamfering in paragraph [0006] and FIG. 8 (a).

Japanese Patent Application Publication No. 8-163320 has proposed that a light scattering pattern is formed on a surface of a light guide by printing white pigment, and the width of the light scattering pattern is gradually decreased toward a light-emitting unit. Also, Japanese Patent Application Publication No. 10-126581 has proposed that a light scattering pattern formed on the end near to a light-emitting unit is a discontinuous shape.

Japanese Patent Application Publication No. 4-329521 has disclosed a light-reflecting portion including fine spherical concave surfaces, and the spherical concave surface is a small concave portion having a hemispherical shape in paragraph [0034].

Japanese Patent Application Publication No. 11-313195 has disclosed that both side surfaces of a light guide are a curved surface whose curvature is increased toward the bottom surface. Japanese Patent Application Publication No. 2002-190917 has disclosed that a light guide is accommodated into a case provided with a light-emitting unit in a state where a light-emitting surface is exposed. Japanese Patent Application Publication No. 11-284232 has disclosed that a light-emitting unit is directly attached to an end surface of a light guide. Japanese Patent Application Publication No. 2000-307808 has disclosed that a light-emitting unit includes light-emitting elements of three primary colors, i.e., Red, Green, and Blue, and the light-emitting elements are positioned at the same interval from a point of the bottom surface of the light guide. Japanese Patent Application Publication No. 11-136451 has disclosed that a light-emitting unit includes light-emitting elements of three primary colors, i.e., Red, Green, and Blue, and the light-emitting elements are positioned at the same interval from the bottom surface of the light guide.

Among the above-mentioned prior art materials, Japanese Patent Application Publication No. 10-112782, Japanese Patent Application Publication No. 2001-201639 and Japanese Patent Application Publication No. 4-329521 have disclosed a light-reflecting portion including a plurality of concave portions. Specifically, the light scattering pattern of Japanese Patent Application Publication No. 2001-201639 is formed by ablation (evaporation) which occurs by irradiating part of the light guide with laser light so that the energy of the laser light is absorbed. However, since the surface of the light scattering pattern is damaged by the ablation, it is impossible to adjust the direction of light scattered by the light scattering pattern.

Japanese Patent Application Publication No. 10-112782 has disclosed a concave portion having a half-cylinder shape, and Japanese Patent Application Publication No. 4-329521 has disclosed a concave portion having a hemispherical shape. Seen from the side of the light guide (the cross section along the longitudinal direction), the concave portion having a half-cylinder shape and the concave portion having a hemispherical shape has the same shape. Thus, light scattering only in the case of the concave portion having a half-cylinder shape will be explained with reference to FIG. 16.

As shown in FIG. 16, among a plurality of concave portions having a half-cylinder shape, as for the concave portion nearest to the light source, light is incident on the base portion. Since the angle of the base portion of the concave portion is close to 90°, the light returns toward the light source side as shown in the figure. On the other hand, as for the other concave portions, since light is incident only on the area near to the bottom surface of the concave portion, the reflected light never returns toward the light source side so that the light can be diffused in a substantially uniform manner. Consequently, when a plurality of concave portions having a half-cylinder shape are formed, only the concave portion nearest to the light source reflects light differently, which results in a lack of uniformity of light distribution.

SUMMARY OF THE INVENTION

In order to solve the above-mentioned drawbacks, according to the present invention, there is provided a light guide having a bar shape or a plate shape in which incident light from an end surface of the light guide is reflected on a light-reflecting portion provided on a flat bottom surface and is emitted from a light-emitting surface. In the light guide, the light-reflecting portion is comprised of a plurality of fine spherical concave surfaces formed to be closely adjacent to each other or spaced apart from each other. In addition, the depth of the fine spherical concave surfaces from the bottom surface of the light guide is 0.23 of the diameter of the sphere or more and 0.33 of the diameter of the sphere or less. Incidentally, the light guide, having a bar shape according to the present invention, must have a flat bottom surface. Therefore, a cylindrical shape is not included, and the disclosed "bar shape" refers to a prism shape in which all the surfaces are a flat surface, or a column shape in which surfaces other than the bottom surface and the light-emitting surface are a curved surface.

According to another aspect of the present invention, there is provided a light guide having a bar shape or a plate shape in which incident light from an end surface of the light guide is reflected on a light-reflecting portion provided on a flat bottom surface and emitted from a light-emitting surface. The light-reflecting portion of the light guide is comprised of a plurality of tubular concave surfaces whose axis is perpendicular to the longitudinal direction of the light guide, the tubular concave surfaces are formed to be adjacent to each other or spaced apart from each other. A circular shape is provided when the tubular concave surfaces are cut in a plane perpendicular to the longitudinal axis of the tubular concave surfaces, and the depth of the tubular concave surfaces from the bottom surface of the light guide is 0.23 of the diameter of the circular shape or more and 0.33 of the diameter of the circular shape or less.

In the above-mentioned light guide, flat chamfered portions may be formed at an angle between both side surfaces and the bottom surface whereby light reflected on the bottom surface can be directed toward the light-emitting surface. Also, the side surfaces may be a curved surface in which the curvature is increased toward the bottom surface.

The present invention also includes a line-illuminating device provided with a light-emitting unit in which the above-mentioned light guide is accommodated into a case such that the light-emitting surface is exposed. The invention also includes an image-scanning device which comprises the line-illuminating device, a line image sensor comprising a photoelectric transducer element, and a lens array for condensing light reflected from a document among light emitted from the line-illuminating device toward the line image sensor.

DETAILED DESCRIPTION

Figure 1:
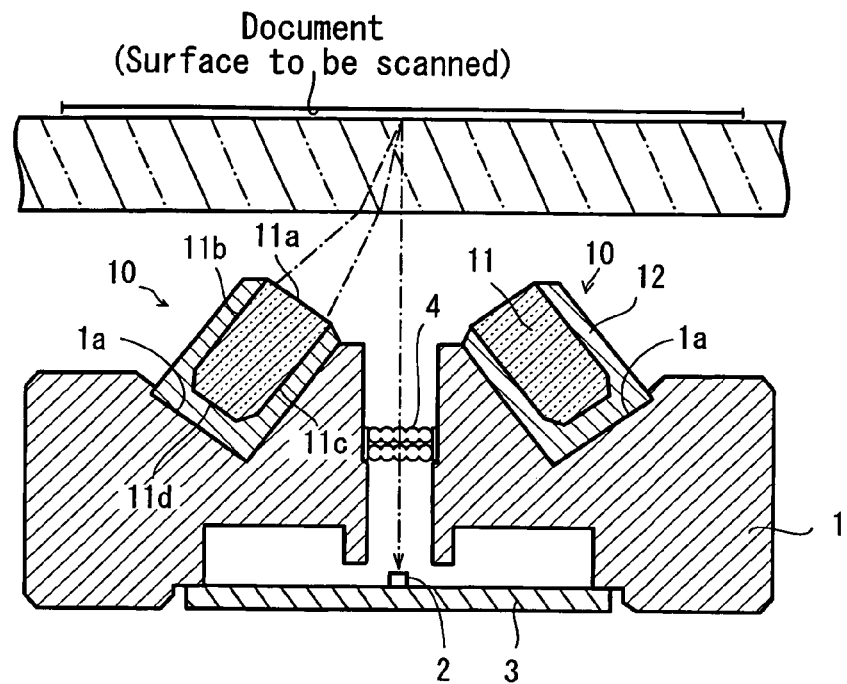
FIG. 1 is a cross-sectional view of an image-scanning device in which a light guide according to the present invention is incorporated as part of a line-illuminating device.
Figure 2:
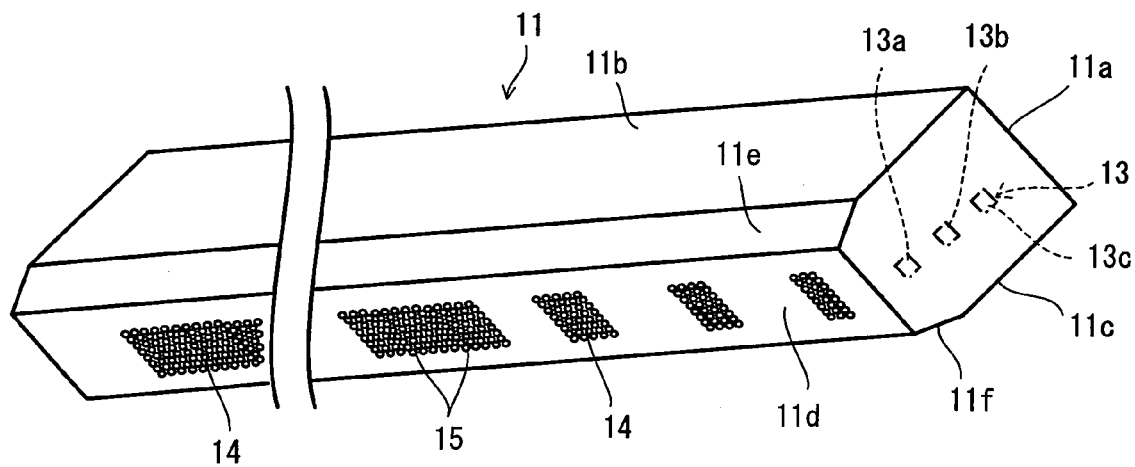
FIG. 2 is a perspective view of the light guide of FIG. 1.

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. FIG. 1 is a cross-sectional view of an image-scanning device in which a light guide according to the present invention is incorporated as part of a line-illuminating device. FIG. 2 is a perspective view of the light guide of FIG. 1.

An image-scanning device is comprised of two line-illuminating devices 10 and 10 provided in recessed portions 1a and 1a of a frame 1, a sensor substrate 3 having a photoelectric transducer element (line image sensor) 2 provided in the bottom, and a lens array 4 for a unit magnification system provided in the center of the frame 1 to condense light reflected from a document among light emitted from the line-illuminating devices 10 toward the photoelectric transducer element 2. Incidentally, a pair of line-illuminating devices 10 are provided in the embodiment shown in the drawing; however, it is also possible to provide only one line-illuminating device.

The lens array 4 is formed as an erecting unit magnification lens by layering a plurality of lens plates (two in the drawing). Each lens plate has a number of microlenses regularly arranged in a two-dimensional way at a predetermined pitch. With this structure of the lens array 4, it is possible to control the decrease of the light amount level caused by the displacement between the lens axis and the image sensor (receiving element) 2, and prevent image distortion from being generated at the time of scanning a linear image. Incidentally, a rod-shaped lens may be used for the lens array 4.

The line-illuminating device 10 is comprised of a white casing 12, a bar-shaped or plate-shaped transparent light guide 11 made of acrylic resin which is housed within the white casing 12, and a light source unit 13 which is attached to one end of the white casing 12. Incidentally, since the light source unit 13 is attached to the white casing 12, it is shown with an imaginary line in FIG. 2. The light source unit 13 has LEDs of three primary colors 13a (green), 13b (red), and 13c (blue). The LEDs 13a, 13b, and 13c are positioned in the same line as the centerline of the bottom surface of the light guide 11 in a state where the light guide 11 is housed within the white casing 12. The interval between the LEDs is 1.25 mm.

In an alternative configuration, the LEDs 13a, 13b, and 13c may be positioned at the same distance from the centerline of the bottom surface of the light guide 11 in a fan shape. With this positioning, it is possible to control non-uniformity of the light intensity.

In a second alternative configuration, the LEDs 13a, 13b, and 13c may be positioned at the same distance from the bottom surface of the light guide 11. More specifically, the LEDs 13a, 13b, and 13c may be positioned such that the perpendiculars from the bottom surface to the LEDs 13a, 13b, and 13c are equal to each other.

The shape of the end surface of the light guide 11 is hexangular. Specifically, the peripheral surfaces of the light guide are constructed of an upper surface 11a to serve as a light-emitting surface, both side surfaces 11b and 11c, a bottom surface 11d, and flat portions 11e and 11f which are formed by C-chamfering between the both side surfaces and the bottom surface. The angle of the flat portions 11e and 11f is adjusted such that light reflected on the bottom surface 11d can be directed toward the upper surface 11a which serves as a light-emitting surface.

All of the above-mentioned peripheral surfaces of the light guide 11 are a flat surface. A light-reflecting portion 14 is formed on the bottom surface 11d so as to distribute light from the end surface uniformly in the longitudinal direction. By arranging the formed areas of the light-reflecting portion so as to be spaced apart from each other in an island shape to the side of the light source unit 13, the light intensity in the main-scanning direction becomes uniform.

Figure 3:
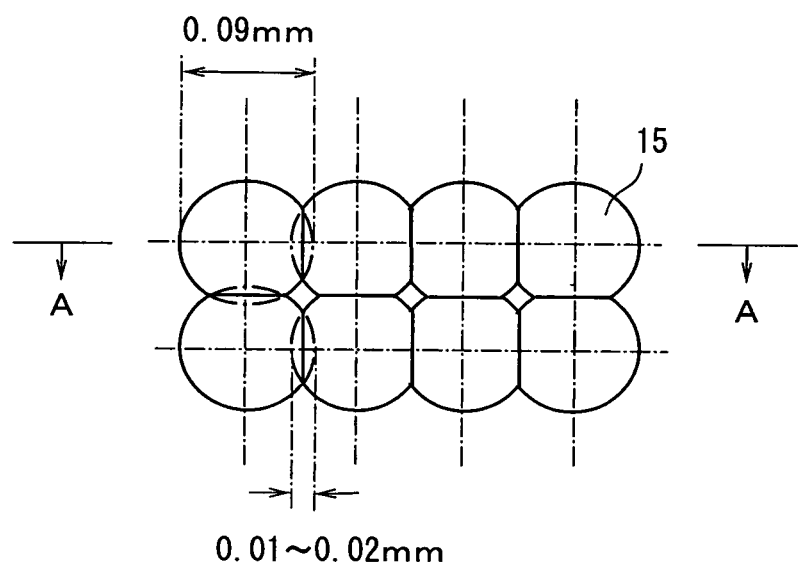
FIG. 3 is an enlarged view of a light-reflecting portion of the light guide of FIG. 1 as seen from the bottom side.
Figure 4:
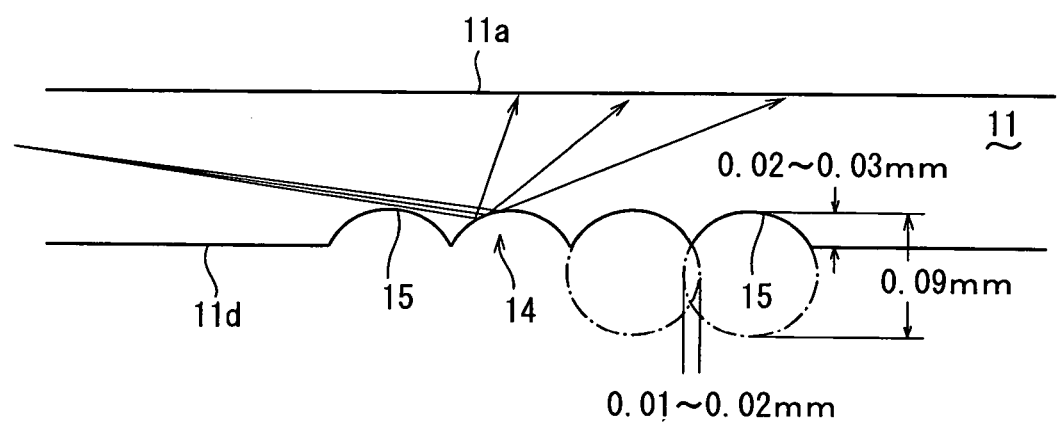
FIG. 4 is a cross-sectional view taken by A—A direction of FIG. 3.

FIG. 3 is an enlarged view of the light-reflecting portion 14 of the light guide seen from the bottom side of the light guide 11, and FIG. 4 is a cross-sectional view as seen along line A—A of FIG. 3. In this embodiment, each formed area of the light-reflecting portion 14 is comprised of a plurality of fine spherical concave surfaces 15 which are provided densely and adjacent to each other.

For example, the cross-sectional shape of the fine spherical concave surface 15 is an arc having a depth from the bottom surface 11d of 0.02–0.03 mm, which is obtained by superposing circles having a diameter of 0.09 mm such that the circles overlap in the range of 0.01–0.02 mm.

Figure 5:
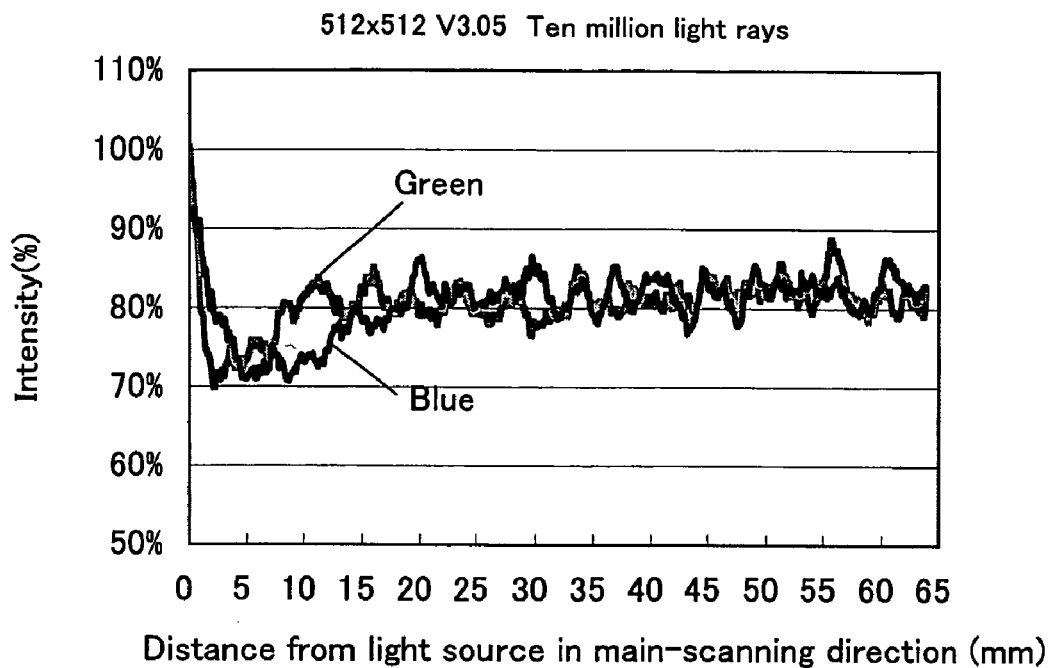
FIG. 5 is a graph showing the degree of color non-uniformity when the depth of the spherical concave surface from the bottom surface of the light guide is adjusted to be ⅓ (0.33) of the diameter of the sphere.
Figure 6:
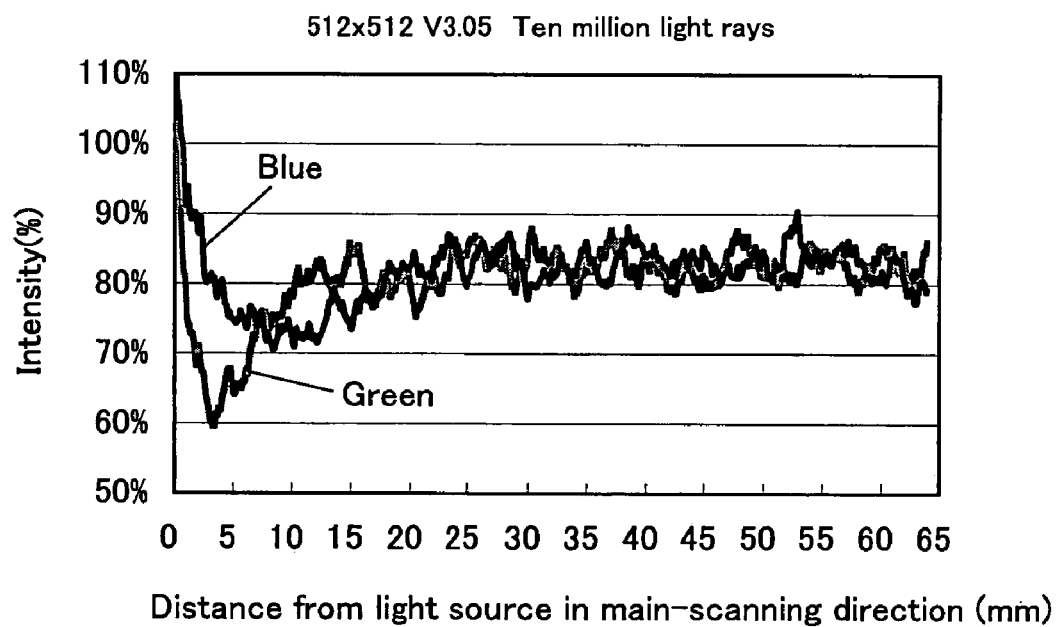
FIG. 6 is a graph showing the degree of color non-uniformity when the depth of the spherical concave surface from the bottom surface of the light guide is adjusted to be ½ of the diameter of the sphere.

Experiments were performed to determine the effectiveness in uniformly diffusing light of the surface shape of the light reflecting portion 14. The experimental results as related to the depth of the fine spherical concave surfaces 15 will be described. FIG. 5 is a graph showing the degree of color non-uniformity when the diameter of the sphere on which the spherical concave surface is based is 30 μm and the depth of the spherical concave surface 15 is 10 μm, that is, the depth of the spherical concave surface is ⅓ (0.33) of the diameter of the sphere, and FIG. 6 is a graph showing the degree of color non-uniformity when the depth of the spherical concave surface is ½ of the diameter of the sphere (perfect hemisphere). As a condition of the experiments, the LED of red is arranged in the center. Accordingly, since the data of red always is in the midpoint between blue and green, it is not shown in the drawing.

FIG. 5 shows that color non-uniformity, especially in the vicinity of the LEDs, can be controlled in the case where the depth of the spherical concave surface 15 is 0.33 of the diameter of the sphere. On the other hand, in the case of FIG. 6, color non-uniformity occurs especially in the vicinity of the LEDs. Incidentally, when the depth of the spherical concave surface 15 is 0.23 of the diameter of the sphere, a similar result to FIG. 5 can be obtained.

From these figures, it turns out that color non-uniformity, especially in the vicinity of the LEDs, can be controlled when the depth of the spherical concave surface is 0.23 or more and 0.33 or less with respect to the diameter of the sphere part of which is the spherical concave surface.

The light-reflecting portion 14, comprised of the spherical concave surfaces 15, becomes a reflecting surface having spherical convex surfaces when it is seen from the inside of the light guide 11. As shown in FIG. 4, even when the incident angle of light from the light source unit 13 is slightly offset, the reflection angle in spherical convex surfaces significantly changes, and light is reflected uniformly toward the upper surface 11a serving as a light-emitting surface. In particular, when the fine spherical concave portions of the light-reflecting portion 14 have a small depth, the incident light from the end surface is reflected toward the upper surface 11a, serving as a light-emitting surface, and toward both side surfaces 11b and 11c without reflecting back to the light-emitting unit side, so that uniform reflection can be achieved.

Figure 7:
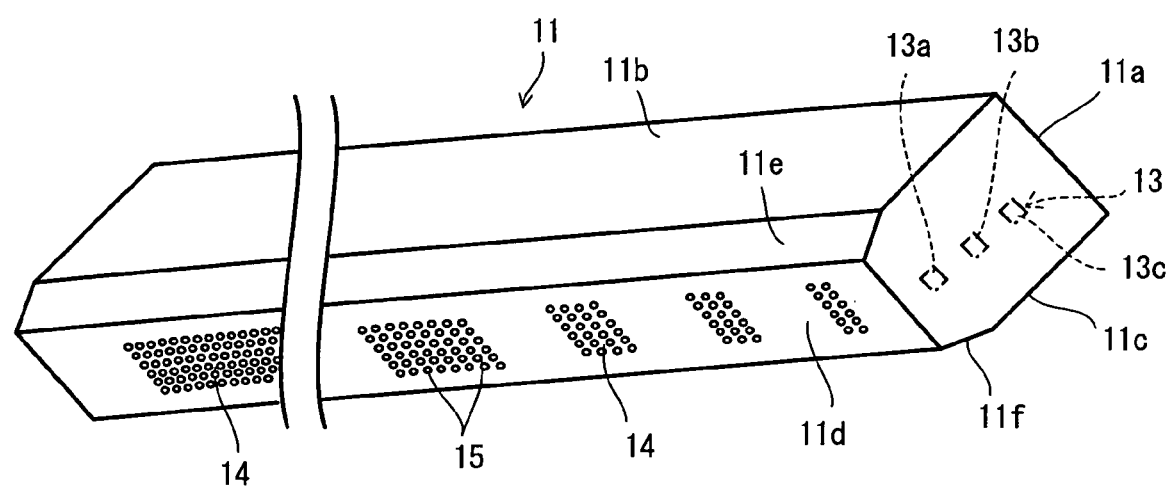
FIG. 7 is a perspective view showing a second embodiment of the light guide.
Figure 8:
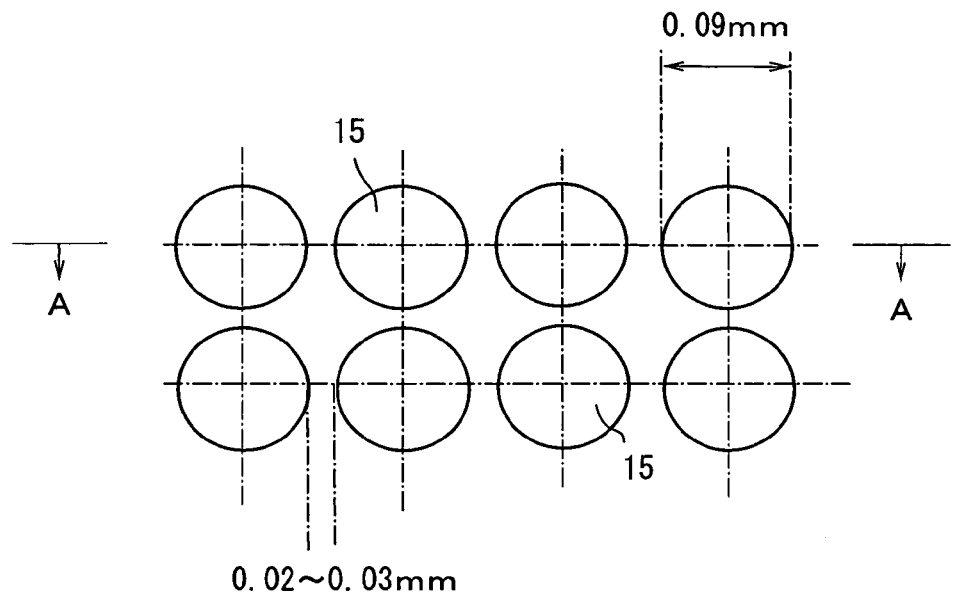
FIG. 8 is an enlarged view of a light-reflecting portion of the light guide of FIG. 7.
Figure 9:
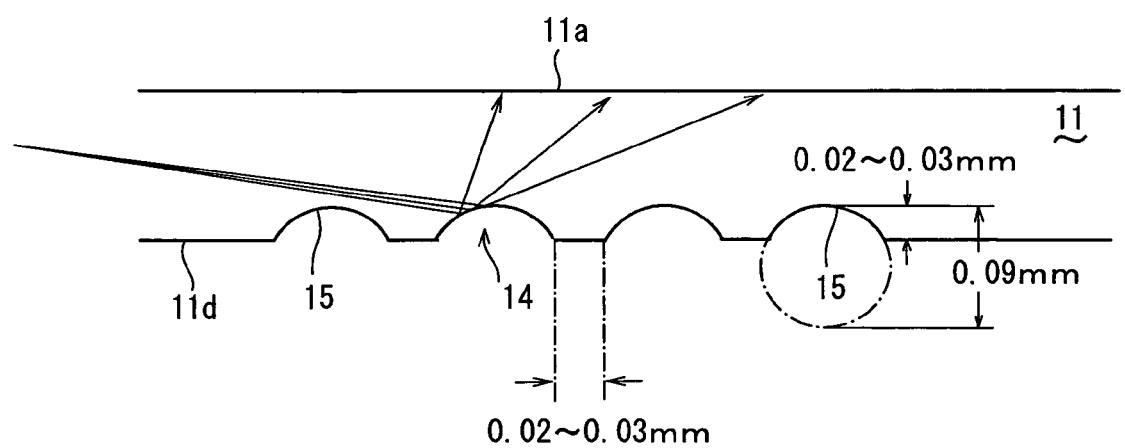
FIG. 9 is a cross-sectional view taken by A—A direction of FIG. 8.

FIG. 7 is a perspective view showing a second embodiment of the light guide, FIG. 8 is an enlarged view of the light-reflecting portion of the light guide of FIG. 7, and FIG. 9 is a cross-sectional view taken by A—A direction of FIG. 8. In this embodiment, the fine spherical concave surfaces are provided to be spaced apart from each other rather than densely arranged and adjacent to each other. For example, in FIG. 8, the concave surfaces 15 are illustrated having a diameter of 0.09 mm, and provide arcs that are spaced apart in the range of 0.02 mm to 0.03 mm.

In this embodiment, it is also preferable that the depth of the spherical concave surfaces from the bottom surface 11d is small. Specifically, the depth is 0.23 of the diameter of the sphere or more, and 0.33 of the diameter of the sphere or less, for the same reason as mentioned above.

Figure 10:
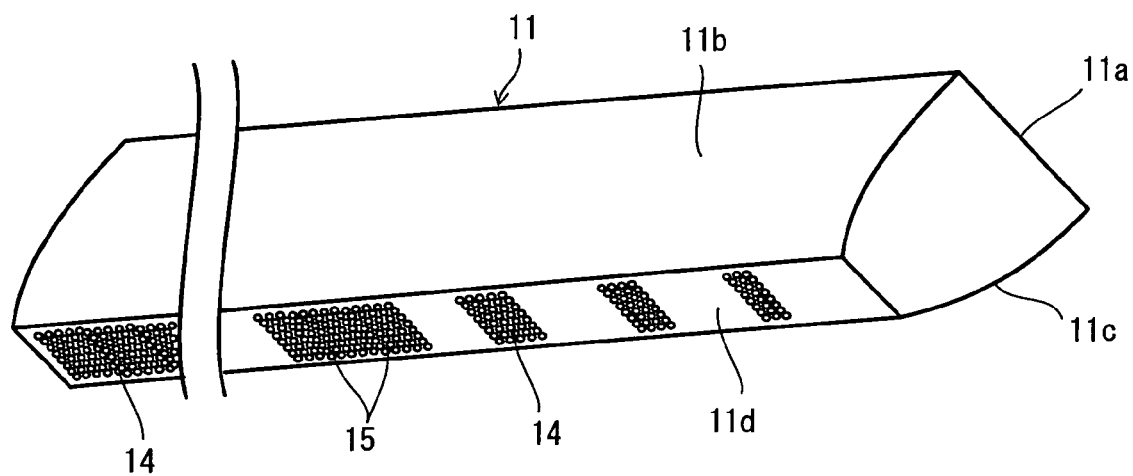
FIG. 10 is a perspective view showing a third embodiment of the light guide.

FIG. 10 is a perspective view showing a third embodiment of the light guide. In this embodiment, the both side surfaces 11b and 11c are formed as a curved surface. The curvature is adjusted to increase toward the bottom surface 11d. As for the curved surface, an elliptic surface or a parabolic surface may be possible, and the curvature may be different between the respective side surfaces so as to increase the depth of focus.

Figure 11:
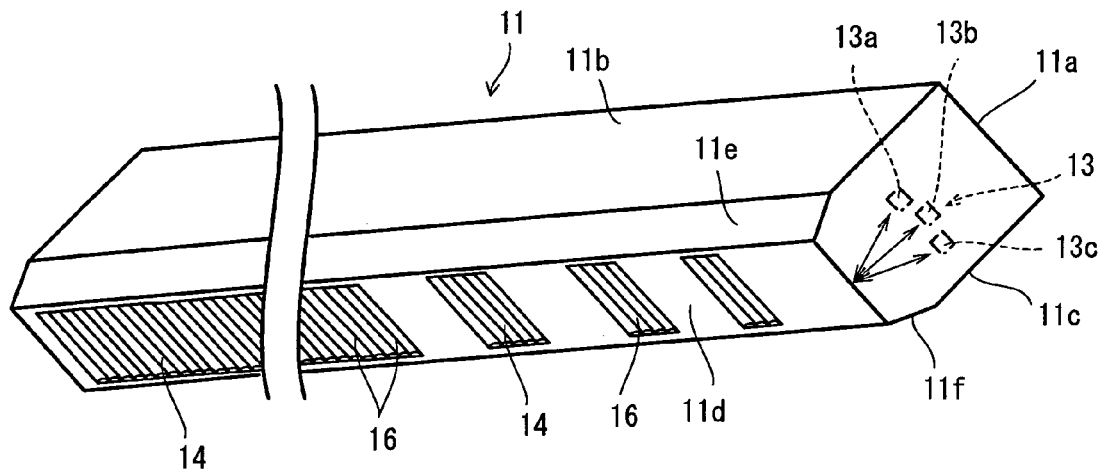
FIG. 11 is a perspective view showing a fourth embodiment of the light guide.
Figure 12:
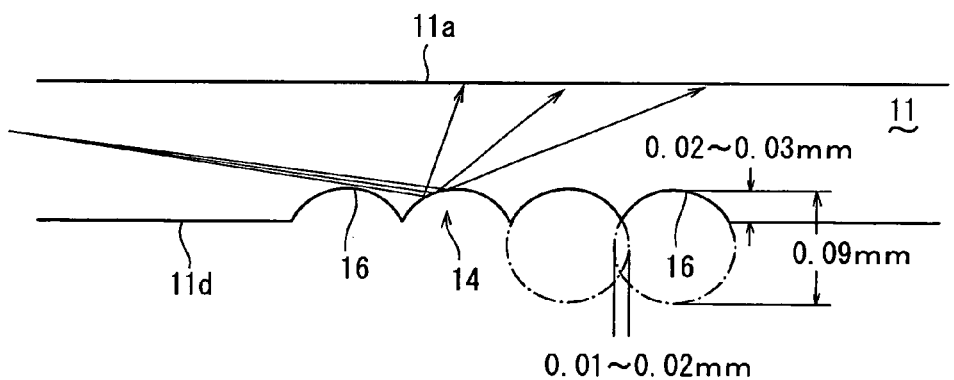
FIG. 12 is an enlarged cross-sectional view of the main part of the light guide of FIG. 11.

FIG. 11 is a perspective view showing a fourth embodiment of the light guide, and FIG. 12 is an enlarged cross-sectional view of the main part of the light guide of FIG. 11. Each of the formed area of the light-reflecting portion 14 is comprised of a plurality of tubular concave surfaces 16. The axis of the tubular concave surface 16 is perpendicular to the longitudinal direction (main-scanning direction) of the light guide. As shown in FIG. 12, the cross-sectional shape of the tubular concave surface 16 cut in a plane perpendicular to the axis of the tubular concave surfaces 16 is, for example, an arc having a depth of 0.02–0.03 mm which is obtained by superposing circles having a diameter of 0.09 mm such that the circles overlap in the range of 0.01–0.02 mm.

The light-reflecting portion 14 comprised of the tubular concave surfaces 16 becomes a reflecting surface having tubular convex surfaces when it is seen from the inside of the light guide 11. As shown in FIG. 12, even when the incident angle of light from the light source unit 13 is slightly offset, the reflection angle in the tubular convex surfaces significantly changes, and light is reflected uniformly toward the upper surface 11a as a light-emitting surface so as to achieve uniform reflection.

The tubular concave surfaces 16 of the light-reflecting portion 14 have a small depth from the bottom surface 11d. Specifically, when the depth is 0.23 or more and 0.33 or less of the diameter of the circle part of which is the cross-section of the tubular concave surfaces, the incident light from the end surface is reflected toward the upper surface 11a serving as a light-emitting surface and both side surfaces 11b and 11c without reflecting back to the light-emitting unit side, so that uniform reflection can be achieved.

Figure 13:
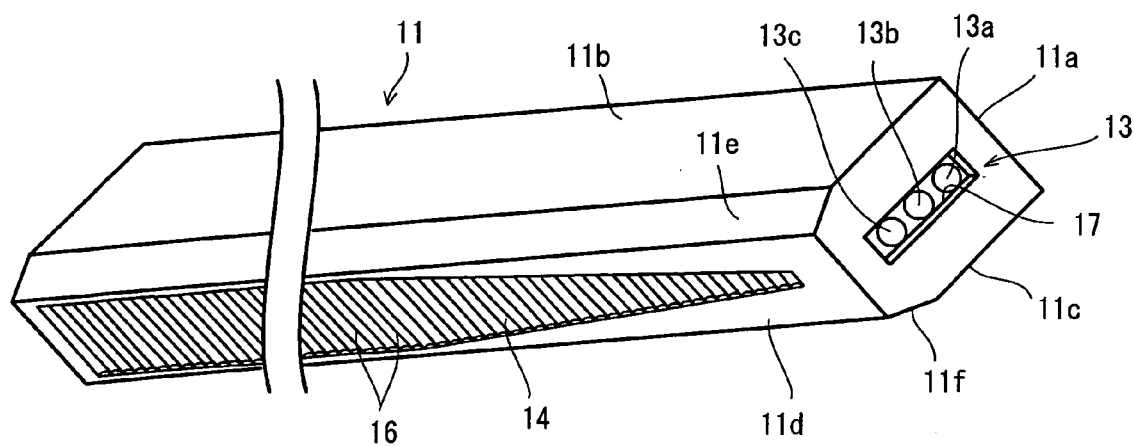
FIG. 13 is a perspective view showing a fifth embodiment of the light guide.

FIG. 13 is a perspective view showing a fifth embodiment of the light guide. In this embodiment, tubular concave surfaces 16 are formed adjacent to each other in the main-scanning direction to form the light-reflecting portion 14, and the width of formed part 14, including the tubular concave surfaces 16, is reduced on the side of the light source unit 13, so that the amount of reflected light can be uniform.

Also, in the embodiment shown in FIG. 13, a recessed portion 17 is provided in the end surface of the light guide 11, and the light source unit 13 is set in the recessed portion 17. As a result of this, the line-illuminating device 11 can be constructed without a casing (for example, white casing 12) in this embodiment. Incidentally, in the case of using the spherical concave surfaces 15 as the light-reflecting portion 14, the same embodiment as shown in FIG. 13 is possible.

Figure 14:
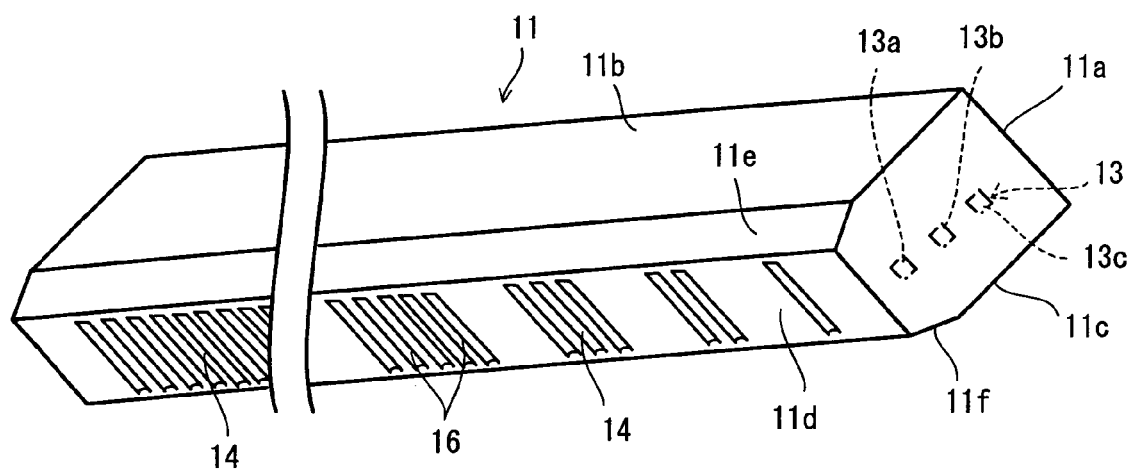
FIG. 14 is a perspective view showing a sixth embodiment of the light guide.
Figure 15:
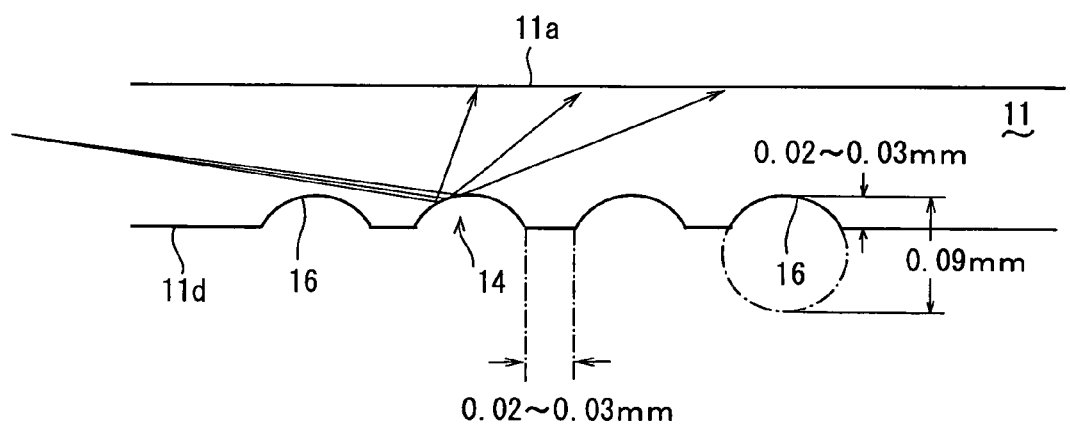
FIG. 15 is an enlarged cross-sectional view of the main part of the light guide of FIG. 14.
Figure 16:
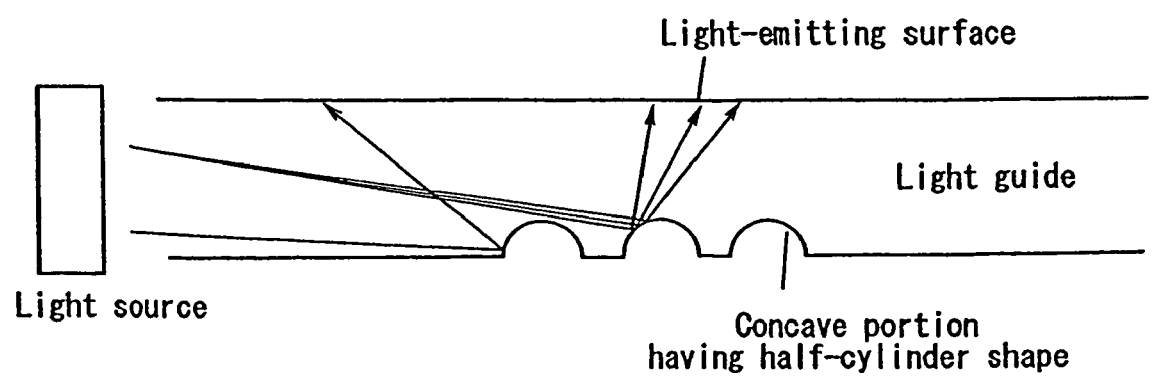
FIG. 16 is a view of a prior art light guide explaining how conventional concave portions having a half-cylinder shape reflect light.

FIG. 14 is a perspective view showing a sixth embodiment of the light guide, and FIG. 15 is an enlarged cross-sectional view of the main part of the light guide of FIG. 14. In this embodiment, the tubular concave surfaces 16 are provided to be slightly spaced apart from each other rather than densely arranged and adjacent to each other in the same manner as in FIG. 7. In the embodiments as shown in the figures, the cross-sectional shape of the spherical concave surface 15 and the tubular concave surface 16 is part of an arc. However, it may be part of an elliptic arc or a combination thereof.

According to the present invention, it is possible to make the intensity of emitted light uniform in the main-scanning direction (the longitudinal direction of the light guide), reduce the non-uniformity of the light amount, and solve the problem of insufficient light amount compared to a conventional light guide having a light-reflecting portion comprised of concave portions having a hemispherical shape or a half-cylinder shape.

While a working example of the present invention has been described above, the present invention is not limited to the working example described above, but various design alterations may be carried out without departing from the present invention as set forth in the claims.

What is claimed is:

1. A light guide having one of a bar shape and a plate shape, the light guide comprising a flat bottom surface, a light emitting surface, and an end surface, wherein
    incident light from the end surface of the light guide is reflected on a light-reflecting portion provided on the bottom surface, and emitted from the light-emitting surface, and
    the light-reflecting portion is comprised of a plurality of spherical concave surfaces formed to be one of adjacent to each other and spaced apart from each other, and
    the depth of the fine spherical concave surfaces from the bottom surface is in the range of 0.23 to 0.33 of the diameter of the spherical concave surface.

2. The light guide according to claim 1, wherein the light guide further comprises side surfaces extending between the bottom surface and light emitting surface, and wherein a flat chamfered portion is formed at an angle between each respective side surface and the bottom surface of the light guide, and
    wherein light reflected on the bottom surface is directed toward the light-emitting surface.

3. The light guide according to claim 1, wherein the light guide further comprises side surfaces extending between the bottom surface and light emitting surface, and
    wherein each side surface of the light guide comprises a curved surface whose curvature increases toward the bottom surface of the light guide.

4. The light guide according to claim 1, wherein the plurality of spherical concave surfaces of the light-reflecting portion are formed to overlap to each other.

5. A light guide having one of a bar shape and a plate shape, the light guide comprising a flat bottom surface, a light emitting surface, and an end surface, wherein
    incident light from the end surface of the light guide is reflected on a light-reflecting portion provided on the bottom surface, and emitted from the light-emitting surface, and
    the light-reflecting portion is comprised of a plurality of tubular concave surfaces whose longitudinal axis is perpendicular to a longitudinal direction of the light guide,
    the tubular concave surfaces are formed to be one of adjacent to each other and spaced apart from each other, and
    the depth of the tubular concave surfaces from the bottom surface is in the range of 0.23 to 0.33 of the diameter of circular sections which are formed when the tubular concave surfaces are cut in a plane perpendicular to the longitudinal axis of the tubular concave surfaces.

6. The light guide according to claim 5, wherein the light guide further comprises side surfaces extending between the bottom surface and light emitting surface, and wherein a flat chamfered portion is formed at an angle between each respective side surface and the bottom surface of the light guide, and
    wherein light reflected on the bottom surface is directed toward the light-emitting surface.

7. The light guide according to claim 5, wherein the light guide further comprises side surfaces extending between the bottom surface and light emitting surface, and
    wherein each side surface of the light guide comprises a curved surface whose curvature increases toward the bottom surface of the light guide.

8. The light guide according to claim 5, wherein the plurality of tubular concave surfaces of the light-reflecting portion are formed to overlap to each other.

9. A line-illuminating device, the line-illuminating device comprising a light guide, the light guide having one of a bar shape and a plate shape, the light guide comprising a flat bottom surface, a light emitting surface, and an end surface, wherein
    incident light from the end surface of the light guide is reflected on a light-reflecting portion provided on the bottom surface, and emitted from the light-emitting surface, and
    the light-reflecting portion is comprised of a plurality of concave surfaces formed to be one of adjacent to each other and spaced apart from each other, and
    the depth of the concave surfaces from the bottom surface is in the range of 0.23 to 0.33 of the diameter of the spherical concave surface.

10. The line illuminating device of claim 9, wherein the concave surfaces comprise spherical concave surfaces.

11. The line illuminating device of claim 9, wherein the concave surfaces comprise tubular concave surfaces.

12. The line illuminating device of claim 9 wherein the light guide is accommodated within a casing, and wherein the casing is supported with a light-emitting unit such that the light-emitting surface is exposed.

13. The light guide according to claim 9, wherein the concave surfaces of the light-reflecting portion are formed to overlap to each other.

14. An image-scanning device comprising
 a line-illuminating device,
 a line image sensor comprising a photoelectric transducer element, and
 a lens array for condensing light reflected from a document among light emitted from the line-illuminating device toward the line image sensor,
 wherein the line illuminating device comprises a light guide, the light guide having one of a bar shape and a plate shape, the light guide comprising a flat bottom surface, a light emitting surface, and an end surface, wherein
 incident light from the end surface of the light guide is reflected on a light-reflecting portion provided on the bottom surface, and emitted from the light-emitting surface, and
 the light-reflecting portion is comprised of a plurality of concave surfaces formed to be one of adjacent to each other and spaced apart from each other, and
 the depth of the concave surfaces from the bottom surface is in the range of 0.23 to 0.33 of the diameter of the spherical concave surface.

15. The image-scanning device of claim 14 further comprising a light-emitting unit, wherein the lens array condenses light reflected from a document among light emitted from the line-illuminating device toward the line image sensor.

16. The image scanning device of claim 14 wherein the plurality of concave surfaces of the light-reflecting portion are formed to overlap to each other.

17. The image scanning device of claim 14, wherein the concave surfaces comprise spherical concave surfaces.

18. The image scanning device of claim 14, wherein the concave surfaces comprise tubular concave surfaces.

19. The image scanning device device of claim 14 wherein the light guide is accommodated within a casing, and wherein the casing is supported with a light-emitting unit such that the light-emitting surface is exposed.

\* \* \* \* \*

UNITED STATES PATENT AND TRADEMARK OFFICE
CERTIFICATE OF CORRECTION

| | |
|---|---|
| PATENT NO. | : 7,088,905 B1 |
| APPLICATION NO. | : 11/354567 |
| DATED | : August 8, 2006 |
| INVENTOR(S) | : Nemoto et al. |

It is certified that error appears in the above-identified patent and that said Letters Patent is hereby corrected as shown below:

Column 1:

Line 45, change "light scattering pattern" to --light-scattering pattern--.
    Line 48, change "plurality of light scat-" to --plurality of light-scat---.
    Line 56, change "light scattering pattern" to --light-scattering pattern--.
    Line 58, change "light scattering pattern" to --light-scattering pattern--.
    Line 60, change "that a light" to --that a light- --.

Column 2:

Line 13, change "Red, Green, and Blue," to --red, green, and blue,--.
    Line 18, change "Red, Green, and Blue," to --red, green, and blue,--.
    Line 26, Line 31, and Line 33, change "light scattering pattern" to --light-scattering pattern--.

Column 5:

Line 20, change "between the both side surfaces" to --between both side surfaces--.
    Line 48, change "light reflecting portion" to --light-reflecting portion--.

Column 6:

Line 7, change "sphere part of which" to --sphere, part of which--.
    Line 39, change "embodiment, the both" to --embodiment, both--.
    Line 49, change "the formed area of" to --the formed areas of--.

Column 7:

Line 4, change "of the circle part of which" to --of the circle, part of which--.
    Line 61, change "to each other and" to --to each other or--.
    Line 67, change "light emitting surface" to --light-emitting surface--.

UNITED STATES PATENT AND TRADEMARK OFFICE
CERTIFICATE OF CORRECTION

PATENT NO. : 7,088,905 B1
APPLICATION NO. : 11/354567
DATED : August 8, 2006
INVENTOR(S) : Nemoto et al.

It is certified that error appears in the above-identified patent and that said Letters Patent is hereby corrected as shown below:

Column 8:

Line 8, change "light emitting surface" to --light-emitting surface--.
Line 14, change "to overlap to each other" to --to overlap each other--.
Line 17, change "light emitting surface" to --light-emitting surface--.
Line 27, change "to each other and" to --to each other or--.
Line 36 and Line 44, change "light emitting surface" to --light-emitting surface--.
Line 50, change "to overlap to each other" to --to overlap each other--.
Line 54, change "light emitting surface" to --light-emitting surface--.
Line 62, change "and spaced apart" to --or spaced apart--.
Line 66, change "The line illuminating device" to --The line-illuminating device--.

Column 9:

Line 1 and Line 3, change "The line illuminating device" to --The line-illuminating device--.
Line 9, change "overlap to each other" to --overlap each other--.
Line 17, change "line illuminating device" to --line-illuminating device--.
Line 20, change "light emitting surface" to --light-emitting surface--.

Column 10:

Line 3, change "and spaced apart" to --or spaced apart--.
Line 14, change "to overlap to each other" to --to overlap each other--.

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,088,905 B1 |
| APPLICATION NO. | : 11/354567 |
| DATED | : August 8, 2006 |
| INVENTOR(S) | : Nemoto et al. |

It is certified that error appears in the above-identified patent and that said Letters Patent is hereby corrected as shown below:

Column 1:

Line 45, change "light scattering pattern" to --light-scattering pattern--.
    Line 48, change "plurality of light scat-" to --plurality of light-scat- --.
    Line 56, change "light scattering pattern" to --light-scattering pattern--.
    Line 58, change "light scattering pattern" to --light-scattering pattern--.
    Line 60, change "that a light" to --that a light- --.

Column 2:

Line 13, change "Red, Green, and Blue," to --red, green, and blue,--.
    Line 18, change "Red, Green, and Blue," to --red, green, and blue,--.
    Line 26, Line 31, and Line 33, change "light scattering pattern" to --light-scattering pattern--.

Column 5:

Line 20, change "between the both side surfaces" to --between both side surfaces--.
    Line 48, change "light reflecting portion" to --light-reflecting portion--.

Column 6:

Line 7, change "sphere part of which" to --sphere, part of which--.
    Line 39, change "embodiment, the both" to --embodiment, both--.
    Line 49, change "the formed area of" to --the formed areas of--.

Column 7:

Line 4, change "of the circle part of which" to --of the circle, part of which--.
    Line 61, change "to each other and" to --to each other or--.
    Line 67, change "light emitting surface" to --light-emitting surface--.

UNITED STATES PATENT AND TRADEMARK OFFICE
CERTIFICATE OF CORRECTION

PATENT NO. : 7,088,905 B1
APPLICATION NO. : 11/354567
DATED : August 8, 2006
INVENTOR(S) : Nemoto et al.

It is certified that error appears in the above-identified patent and that said Letters Patent is hereby corrected as shown below:

Column 8:

Line 8, change "light emitting surface" to --light-emitting surface--.
Line 14, change "to overlap to each other" to --to overlap each other--.
Line 17, change "light emitting surface" to --light-emitting surface--.
Line 27, change "to each other and" to --to each other or--.
Line 36 and Line 44, change "light emitting surface" to --light-emitting surface--.
Line 50, change "to overlap to each other" to --to overlap each other--.
Line 54, change "light emitting surface" to --light-emitting surface--.
Line 62, change "and spaced apart" to --or spaced apart--.
Line 66, change "The line illuminating device" to --The line-illuminating device--.

Column 9:

Line 1 and Line 3, change "The line illuminating device" to --The line-illuminating device--.
Line 9, change "overlap to each other" to --overlap each other--.
Line 17, change "line illuminating device" to --line-illuminating device--.
Line 20, change "light emitting surface" to --light-emitting surface--.

Column 10:

Line 3, change "and spaced apart" to --or spaced apart--.
Line 14, change "to overlap to each other" to --to overlap each other--.

This certificate supersedes Certificate of Correction issued December 5, 2006.

Signed and Sealed this

Sixteenth Day of October, 2007

JON W. DUDAS
*Director of the United States Patent and Trademark Office*